April 15, 1924.

R. I. FROST

TURBINE ENGINE

Filed Dec. 6, 1920

Witness:

R.L. Hamilton

Inventor,

Ralph I. Frost

By Warren W. House

His Attorney,

April 15, 1924.
R. I. FROST
TURBINE ENGINE
Filed Dec. 6, 1920 3 Sheets-Sheet 2
1,490,378
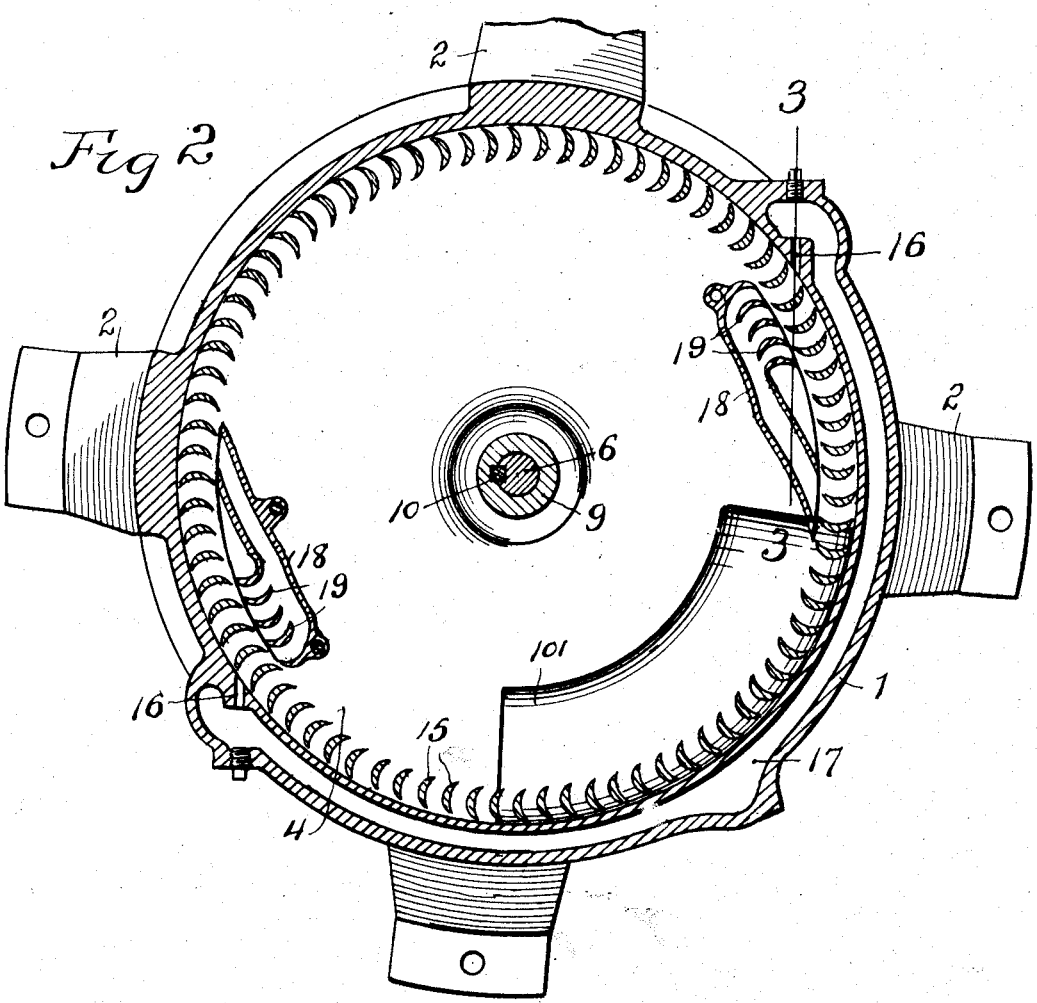
Fig 2
Fig 3
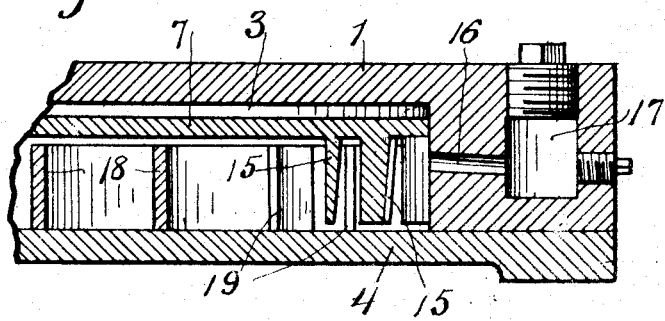
WITNESS:
R. E. Hamilton
INVENTOR.
Ralph I. Frost
BY
Warren D. House
His ATTORNEY.

April 15, 1924.  
R. I. FROST  
TURBINE ENGINE  
Filed Dec. 6, 1920  
1,490,378  
3 Sheets-Sheet 3
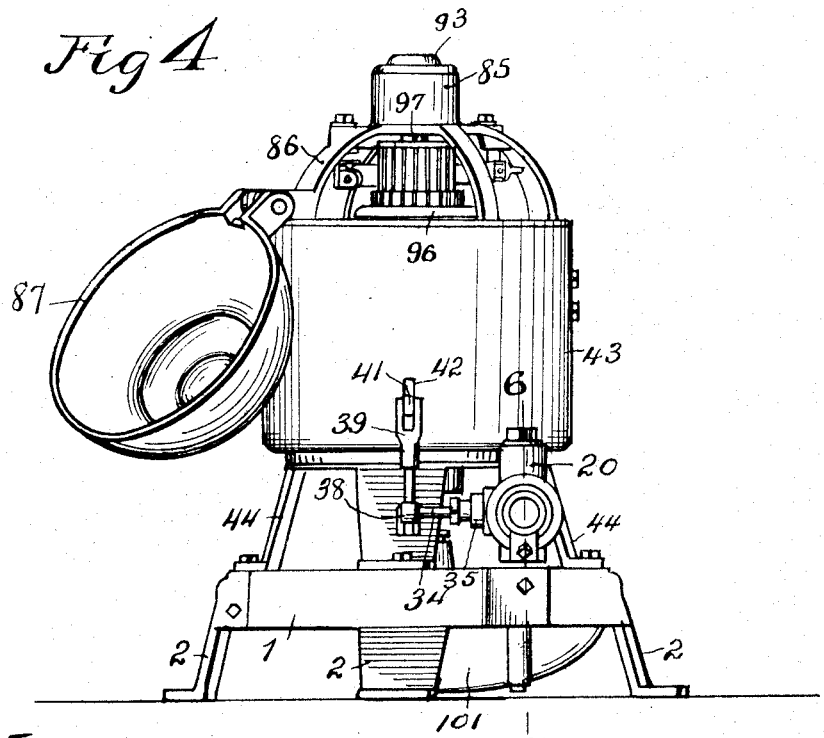
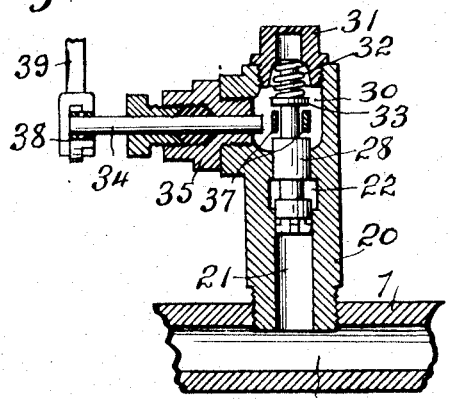
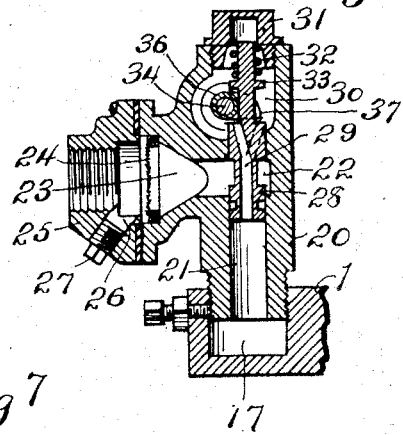
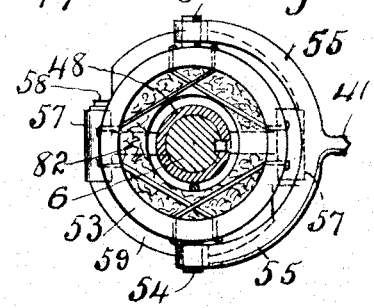
WITNESS:  
R. L. Hamilton
INVENTOR.  
Ralph I. Frost  
BY Warren D. House  
His ATTORNEY.

Patented Apr. 15, 1924.

1,490,378

UNITED STATES PATENT OFFICE.

RALPH I. FROST, OF AUGUSTA, KANSAS, ASSIGNOR TO THE GEO. W. BROWN & SON STATE BANK, TRUSTEE, OF AUGUSTA, KANSAS.

TURBINE ENGINE.

Application filed December 6, 1920. Serial No. 428,701.

*To all whom it may concern:*

Be it known that I, RALPH I. FROST, a citizen of the United States, residing at Augusta, in the county of Butler and State of Kansas, have invented a certain new and useful Improvement in Turbine Engines, of which the following is a specification.

My invention relates to improvements in turbine engines.

It is particularly adapted for use in turbine generators.

The object of my invention is to provide a novel turbine engine of the type having a vertical driving shaft and a turbine wheel attached thereto, in which the fluid pressure which rotates the turbine wheel tends to support the shaft and wheel so as to reduce friction and afford an easy running machine.

My invention provides further novel bearings for the driving shaft.

My invention provides still further novel mechanism for controlling the supply of fluid under pressure to the turbine wheel.

My invention further provides a turbine generator having novel means for protecting the armature from being injured by the fluid which propels the turbine wheel.

My invention provides still further a novel turbine generator which is simple in construction, cheap to make, durable and not liable to get out of order, which occupies relatively small floor space, which is readily accessible for the purposes of lubrication, repairing or changing the speed.

The novel features of my invention are hereinafter fully described and claimed.

In the accompanying drawings which illustrate the preferred embodiment of my invention.

Fig. 2 is a horizontal sectional view on the line 2—2 of Fig. 1.

Fig. 3 is a vertical sectional view, enlarged, on the line 3—3 of Fig. 2.

Fig. 4 is a side elevation of my improved generator, with the cover shown in the open position.

Fig. 5 is a vertical sectional view on the line 5—5 of Fig. 1.

Fig. 6 is a vertical sectional view, enlarged, on the line 6—6 of Fig. 4.

Fig. 7 is a cross section just below the armature winding.

Similar reference characters designate similar parts in the different views.

Figure 1:
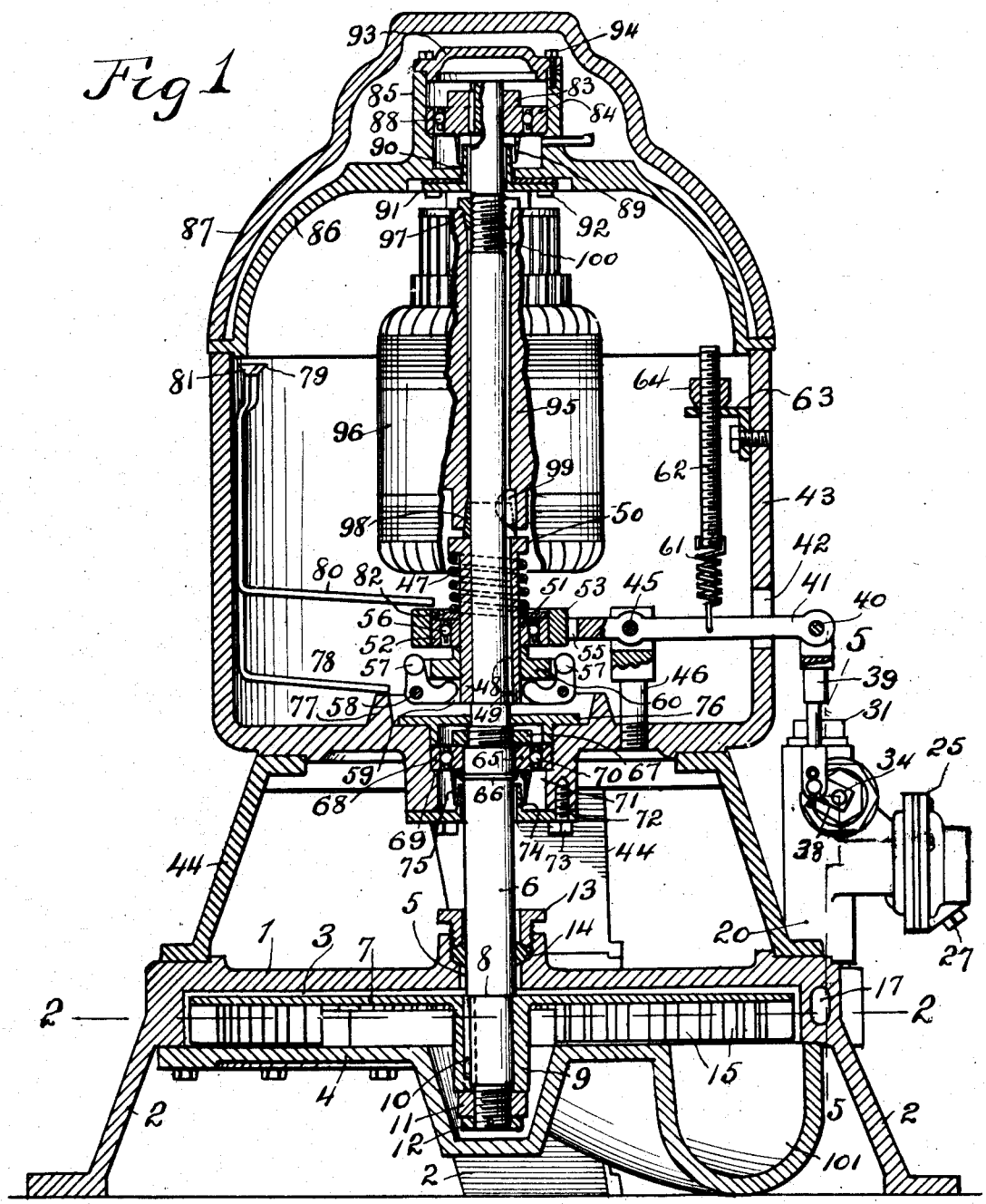
Fig. 1 is a vertical central sectional view of my improved turbine generator.

In the form of my invention shown in the drawings, there is provided a support comprising the following described parts.

1 designates a horizontal substantially circular base member of a turbine wheel casing provided with supporting legs 2 and having in its under side a circular recess 3, the lower side of which is normally closed by a plate 4.

Base member 1 is provided with a central vertical hole 5 through which extends a vertical driving shaft 6 to which is rigidly secured a turbine wheel within the recess or turbine wheel chamber 3.

The turbine wheel comprises, preferably, a horizontal disk 7, which fits against a shoulder 8 on the shaft 6 and which has a central hub 9 fitted on the shaft 6 and held from rotation thereon by a key 10, Fig. 1. The lower end of the shaft 6 is screw threaded and has fitted thereon a nut 11 which bears against the lower end of the hub 9. A lock nut 12 on the shaft 6 bears against the nut 11.

Encircling the shaft 6 is a collar 13 having threaded connection with the base member 1 and bearing against packing 14, which encircles the shaft 6 in the member 1.

Extending downwardly from the under side of disk 7 is a circular row of propelling blades 15, each of which is, preferably, concavo-convex, the concave side, as shown in Fig. 3, being slightly inclined to the vertical, the concave side being the under side of the blade.

In the base member 1 are two oppositely disposed passages 16, Figs. 2 and 3, which, preferably, incline upwardly toward the blades 15, and which are arranged to discharge an upwardly inclined fluid jet under pressure inwardly against the concave sides of the blades 15. The outer ends of the passages 16 communicate with an arcuate semicircular passage 17 provided in the base member 1. By having the fluid jet, such as steam, projected upwardly against the blades 15 and by having the blades 15 inclined, as described, the pressure of the impelling fluid is such as to tend to rotate and to lift the turbine wheel and driving shaft 1, thereby reducing friction, so as to afford an easy running machine.

Mounted on the upper side of the member 4 are two diametrically opposite fluid conductors 18, which are disposed at the inner side and closely adjacent to the blades 15 at points respectively opposite to the passages 4, the latter being arranged to discharge between the blades 15 into the intake ends respectively of the conductors 18. The conductors 18 are arranged to discharge against the concave sides of the blades 15, see Fig. 2. In the intake end of each conductor 18 are arranged a plurality of abutments 19, preferably concavo-convex and disposed reversely with respect to the blades 15, and which are attached at their lower ends to the member 4. The abutments 19 are arranged so as to register with the blades 15.

Fluid under pressure, such as steam, passing from the passage 17 through the passages 16 will strike against and go inwardly between the blades 15 and into the intake end of each conductor 18 between the blades 19 and will then again be discharged from the conductors 18 outwardly against the blades 15. This construction affords a very efficient mechanism.

For regulatably supplying the passage 17, I provide a valve controlled mechanism of any suitable design. In the form shown a valve casing 20 has its lower threaded end fitted in a threaded hole in the top of the member 1. The casing 20 is provided with a central vertical hole 21, the lower end of which communicates with the passage 17 and which intersects a port 22, Figs. 5 and 6, which communicates with a lateral passage 23 across which extends a screen 24. Attached to the casing 20 is a collar 25 adapted to be connected with a steam pipe not shown, which supplies steam under pressure to the machine. The under side of the collar 25 is provided with a drain passage 26, normally closed by a screw plug 27.

Vertically slidable in the passage 21 is a cylindrical valve 28 having a vertical passage 29, Fig. 6, which at its lower end communicates with the passage 21, and which at its upper end communicates with a chamber 30 having a threaded opening normally closed by a screw plug 31 and in alinement with the passage 21.

The valve 28 is arranged to open and close the port 22 and is normally forced toward the closed position by a coil spring 32 which encircles the valve 28 and which bears at its lower end against a peripheral flange 33 on the valve 28, the upper end of the spring being arranged to bear against the screw plug 31.

For opening the valve 28 against the pressure of the spring 32, I provide a horizontal rock shaft 34 which is rotatably mounted in a screw plug 35 fitted in a lateral threaded hole in the casing 20 and which communicates with the chamber 30. Secured to the rock shaft 34 in the chamber 30 is a sleeve 36, Fig. 6, which is provided with two laterally extending arms 37 which are disposed at opposite sides respectively of the valve 28 and which are adapted to bear against the under side of the flange 33.

For rocking the shaft 34 to lift the valve 28, the rock shaft 34 is provided at its outer end with a crank 38 to which is pivoted the lower end of a connecting rod 39, the upper end of which is pivoted by a horizontal pin 40 to the outer end of a substantially horizontal lever 41, Fig. 1, which extends through a slot 42 in the side wall of a cylindrical casing 43, the lower end of which is supported by legs 44 mounted on the upper side of the base member 1. An air space is provided between the base member 1 and the casing 43 to prevent the heating of the casing 43 by the member 1.

The lever 41 is pivoted by a horizontal bolt 45 to the upper end of vertical post 46, the lower end of which is threaded and fitted in a threaded hole in the lower closed end of the casing 43.

When the outer end of the lever 41 is swung upwardly a sufficient distance, the valve 28 will be opened by means of the rod 39, crank 38, rock shaft 34 and arms 37. This action of the lever 41 is effected by means of a vertical coil spring 47, Fig. 1, which encircles a sleeve 48 mounted on the shaft 6 within the casing 43 and keyed to said shaft by a key 49. The upper end of spring 47 bears against a peripheral flange 50 on the sleeve 48. The lower end of the spring 47 bears against a bearing collar or member 51 which encircles and is longitudinally slidable on the sleeve 48 and which is encircled by and spaced apart from a bearing member 52 of annular form and which is rigidly attached to the inner side of a ring member 53 having two oppositely disposed trunnions 54, Fig. 7, which are respectively pivoted to two arms 55 provided at the inner end of the lever 41. Balls 56 are disposed between and having a bearing against the ring bearing members 51 and 52.

Suitable speed actuated means are provided for swinging the inner end of the lever 41 upwardly against the pressure of spring 47 such means may comprise centrifugally operated members 57 which are pivoted respectively by transverse pins 58 to lateral arms 59 on the sleeve 48. The inner ends of the members 57 are adapted to bear against the lower side of a collar 60 which is vertically slidable on the sleeve 48 and which is adapted to bear at its upper end against the ring member 51. As the speed of the shaft 6 increases, the weighted members 57 will be swung outwardly, thus lifting the collar 60 and member 51, thereby swinging the outer end of the lever 41 downwardly to close the valve through the intermediacy of the balls 56 and members 52 and 53.

For adjustable regulation of the closing of the valve 28, the lever 41 at the right of the bolt 45, as viewed in Fig. 1, has attached to it the lower end of a vertical coil spring 61, the upper end of which is attached to a vertical screw 62, which is vertically slidably mounted in a horizontal arm of a right angle bracket 63, which is fastened to the inner wall of the casing 43. A nut 64 is mounted on the screw 62 and rests upon the bracket 63. By adjusting the nut 64, the upward pull on the lever 41 by the spring 61 may be varied. By adjusting the nut 64, so as to increase the tension of the spring 61, the speed of the shaft 6 may be increased.

The shaft 6 is mounted in two bearings, preferably of the ball bearing type, supported by the casing 43. The lower bearing comprises the following described parts.

A ring bearing member 65, Fig. 1, is mounted on the shaft 6 and is held against a peripheral shoulder 66 by a nut 67 mounted on a screw threaded part of the shaft above the shoulder 66.

A ring bearing member 68 encircles and is spaced apart from the member 65 and rests upon an annular shoulder 69 in the bottom of the casing 43. Balls 70 are mounted in seats provided therefor in the bearing members 65 and 68.

The shaft 6 extends through a central opening 71 in the bottom of the casing 43. A removable plate 72 is attached by bolts 73 to the bottom of the casing 43 and is provided with an upwardly extending tubular projection 74, thereby forming an oil well into which extends the lower end of an annular extension 75, which encircles the tubular projection 74 and which is attached to and rotates with the ring member 65. The outer side of the extension 75 is upwardly and outwardly flaring, so that when the shaft 6 is rotated, and with it the ring member 65 and its flaring extension 75, the oil on the plate 72 will be thrown upwardly and outwardly against the balls 70 and against the ring members 65 and 68. The upper end of the opening 71 has loosely fitted in it a removable cover 76 which is encircled by an annular upwardly extending flange 77 on the upper side of the bottom of the casing 43. This flange with the bottom of the casing 43 forms an oil receptacle into which oil may be fed by a pipe 78 attached to the inner side of the casing 43 and having a funnel 79 at its upper end. A similar pipe 80 attached to the inner wall of the casing 43 and having at its upper end a funnel 81 is arranged to discharge upon a felt pad 82 disposed on the upper side of the ring member 52. The oil feeds from this pad downwardly upon the ring members 51 and 52 and onto the balls 56. The oil within the flange 77 passes under the loosely fitting cover 76 and onto the balls 70 and ring members 65 and 68 and downwardly therefrom onto the plate 72.

The upper bearing for the shaft 6 is composed of the following described parts.

Keyed on the upper end of the shaft 6 is a ring bearing member 83, Fig. 1, which is encircled by and spaced apart from a ring bearing member 84 mounted in a central tubular portion 85 extending upwardly from the top of a spider 86 mounted on and fitted in the upper open end of the casing 43. Hinged to the spider 86 is a cover 87, arranged to close the top of the casing 43 to protect the contents of the casing 43 from injury from outside sources.

Balls 88 are mounted in annular seats provided in the ring members 83 and 84.

The lower side of the member 83 has an annular extension 89, the outer wall of which flares upwardly and outwardly. The extension 89 encircles an upwardly extending tubular portion 90 on the upper side of a removable plate 91, which is attached by bolts 92 to the under side of the spider 86. An oil receptacle is thus formed in the tubular portion 85. When the member 83 revolves with the shaft 6, oil is carried upwardly and outwardly against the members 83 and 84 and balls 88 by the flaring outer wall of the tubular extension 89. A removable cover 93 is attached to the upper end of the tubular portion 85 by bolts 94.

Mounted on and spaced apart from the shaft 6 in the casing 43 is a hub 95 of an armature 96, the latter cooperating with field magnets, not shown, located in the casing 43.

Two longitudinally divided tapering collars 97 and 98 are respectively fitted in the upper and lower ends of the hub 95. The latter is made rotatable with the shaft 6 by a key 99. The collar 98 embraces the shaft 6 and is supported on the upper end of the sleeve 48. The collar 97 is screw threaded and fitted on a threaded portion 100 of the shaft 6.

By mounting the armature 96 in the closed casing 43, which is located above and spaced apart from the turbine chamber 3, there is no liability of damage to the armature and field magnets of the generator from escaping steam, water or heat from the turbine chamber 3.

By providing a vertical shaft and having mounted on it the turbine wheel and armature, and utilizing the fluid pressure, which rotates the turbine wheel and with it the shaft 6 and armature 96, for lifting and supporting the turbine wheel, a double function is effected and the bearings which contain the balls 70 and 88 are not required to support the weight of the turbine wheel, driving shaft and armature, excepting when the engine is at rest. When the engine is running these bearings are required only to hold the driving shaft from lateral movement. Much friction and wear is thus eliminated.

By swinging the cover 87 to the open position, access to the interior of the casing 43 is obtained, for the purpose of changing the speed of the engine by adjustment of the nut 64, for supplying oil to the bearings in the casing 43 or for any other purpose.

In the operation of my invention, the springs 47 and 61 initially swing the outer end of the lever 41 upwardly, thereby forcing the valve 28 upwardly, so that the passage 21 is in operative communication with the inlet port 22. Fluid under pressure, such as steam from a boiler then passes through the collar 25, passage 23, port 22 and passages 21 and 17 to the inclined passages 16, from which fluid jets are laterally and upwardly projected against the inclined concave sides of the blades 15, thereby rotating and lifting the turbine wheel and with it the shaft 6 and armature 96. The propelling fluid passes between the blades 15 and abutments 19 and through the conductors 18 and is discharged by the latter against the concave sides of the blades 15. The exhaust steam passes out of the chamber 3 through an outlet pipe 101 with which the plate 4 is provided.

I do not limit my invention to the structure shown and described, as many modifications, within the scope of the appended claims, may be made without departing from the spirit of my invention.

What I claim is:

1. In a turbine engine, a support, a vertical shaft rotatable thereon, a turbine wheel secured to and rotatable with and adapted to support said shaft and comprising a horizontal disk having on its under side downwardly extending propelling blades having upwardly inclined under sides, and means for projecting an upwardly inclined fluid jet under pressure against the under side of said disk and against the upwardly inclined under sides of said blades, substantially as set forth.

2. In a turbine engine, a support, a vertical shaft rotatable thereon, a turbine wheel secured thereto and rotatable therewith and adapted to support said shaft and having a horizontal disk provided on its under side with a circular row of downwardly extending concavo-convex blades, the concave sides being upwardly inclined and the under sides of the blades, a fluid conductor on said support at the inner side of said blades and arranged to discharge against the concave sides of the blades and having in its intake end concavo-convex abutments adjacent to and adapted to register with said blades and reversely disposed with respect to the blades, and means for projecting an upwardly inclined fluid jet under pressure inwardly against the concave sides of and between said blades and into the intake end of said conductor, substantially as set forth.

In testimony whereof I have signed my name to this specification.

RALPH I. FROST.